Dec. 10, 1929.   L. THIRY   1,739,270
PROCESS AND MACHINE FOR MANUFACTURING OSCILLATING JOINTS AND SUPPORTS
Filed July 17, 1928

Leon Thiry
INVENTOR
By *Otto Munk*
his ATTY.

Patented Dec. 10, 1929

1,739,270

UNITED STATES PATENT OFFICE

LEON THIRY, OF HUY, BELGIUM

PROCESS AND MACHINE FOR MANUFACTURING OSCILLATING JOINTS AND SUPPORTS

Application filed July 17, 1928, Serial No. 293,373, and in France September 9, 1927.

The present invention relates to a method of manufacturing flexible joints or supports for oscillating parts which comprise two concentric metallic sleeves, or the like, a ring or insert of elastic material such as india rubber or like substance, which has been subjected to a suitable initial deformation.

It is known that the ring of elastic material which is inserted into the annular space between the two concentric sleeves has in the free state, that is prior to its insertion between the sleeves, an external diameter which is much larger than the internal diameter of the external sleeve, and an internal diameter which is much smaller than the external diameter of the internal sleeve; in these conditions, when the elastic ring is inserted into the annular space between the sleeves, it is considerably elongated in the axial direction.

For various reasons, and in spite of the use of the best lubricants, this considerable elongation cannot be effected in practice when the elastic ring is inserted at a relatively slow speed between the two concentric sleeves or the like.

According to the invention, I insert the elastic ring between the two concentric sleeves at a high speed, preferably by means of a compressed air press, provided with a special attachment which will be further described.

Figure 1:
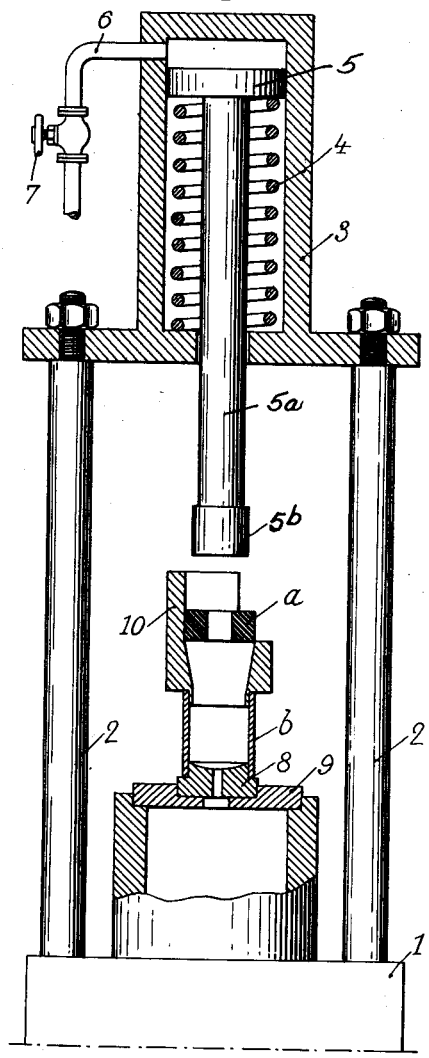

In the appended drawings, and by way of example:

Fig. 1 is a diagrammatic axial section of a compressed air press for the insertion of the elastic ring into the external socket.

Figure 2:
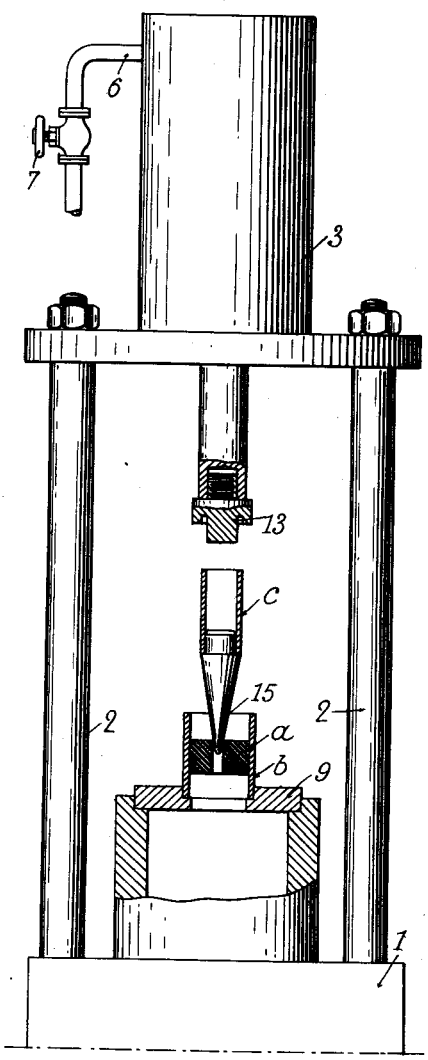

Fig. 2 is a view similar to Figure 1 showing the press provided with the attachment for the insertion of the internal sleeve into the elastic ring.

Figure 3:
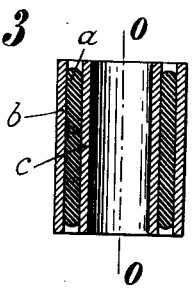

Fig. 3 shows an oscillating joint manufactured by the process according to the invention.
In manufacturing an oscillating joint as shown in Fig. 3, comprising coaxial sleeves $b$ and $c$ and a rubber ring or elastic insert $a$, I insert in the first place the elastic ring $a$ into the external metallic sleeve or like member $b$; for this purpose I preferably utilize a compressed air press of the type illustrated in Fig. 1, which comprises a base plate 1 and two uprights 2 for supporting the press cylinder 3 containing the piston 5, which is movable against the action of the spring 4 and carries a rod $5^a$ formed at one end with a head $5^b$. Compressed air is admitted through a pipe 6 provided with throttling means 7, consisting of a cock, a valve or the like. A thrust member 8, having a concave face at the top, is mounted on a removable base 9 and serves to centre the sleeve $b$. Upon the latter is mounted a funnel-shaped guiding socket 10 whose diameter at the lower part is somewhat smaller than the internal diameter of the sleeve $b$.

The operation is as follows:

The ring $a$ and the sleeve $b$ are preliminarily immersed in a lubricating substance (water or the like); the sleeve $b$ is then shifted upon the ring 8 and the socket 10, containing the ring $a$ is inserted at the top of sleeve $b$. The press is then supplied with compressed air. The ring $a$ is driven down at a great speed by the head $5^b$ of the piston rod $5^a$ and enters the sleeve $b$, and this insertion is effected almost instantaneously. Since the external diameter of the elastic ring is greater than the internal diameter of the sleeve $b$, this first operation will already produce a certain elongation of the elastic ring. Due to the presence of the thrust member with concave face 8, the elastic ring $a$ may be placed at any desired height in the sleeve $b$; the concave face will act to give a convex form to the end of the elastic ring, whereby one end of the axial bore thereof will be slightly flaring outwardly, thus facilitating the second operation.

The second operation is then performed, and this consists in the insertion of the internal sleeve $c$ into the elastic ring $a$. For this purpose I employ a press (Fig. 2) similar to the preceding, but in which the piston rod 5 is provided with a head 13 provided with a boss and with an annular groove for the insertion of the internal sleeve $c$ which is to be inserted into the elastic ring $a$. At the end of said sleeve $c$ is inserted a tapered punch provided with a centering nib fitting into sleeve c. The parts being placed in the position shown in Fig. 2, the press is operated at such a high speed that the sleeve c will be almost instantaneously inserted into the ring a, thus effecting a considerable elongation of the said ring, which may be 150–200 per cent, for example.

Experience has shown that this process will afford elongations of such amplitude that the elastic limit of the india rubber is almost attained (even for the best quality of india rubber), for instance 700 per cent. When the rubber ring has been inserted, the punch 15 is expelled from the sleeve c by the action of the acquired speed, and the piston then rises without drawing back the sleeve c.

The oscillating joints which are obtained by my said process and wherein the rubber insert is considerably elongated, are particularly adapted for supporting heavy radial and longitudinal stresses, as in the case of the oscillating joints of suspension springs for motor vehicles, the cardan joints of motor vehicles, the mounting of shock absorbers, the pivot joints of brake operating gears, and the like. The expression "radial stress" refers to stresses perpendicular to the axis 0—0 of the joint (Fig. 3); longitudinal stress refers to the stresses parallel with the said axis.

The said oscillating joints or supports will possess, for a minimum size (other factors being equal) a maximum angle of oscillation without any slipping of the elastic ring with reference to the internal and external sleeves. They will optionally provide for movements of small amplitude about other axes than 0—0.

The said devices may also be employed to advantage as stationary supports for connecting different parts which are to be rigidly secured together but should be protected against jarring motion, jerks, or which should be electrically insulated; this is the case for instance in the mounting of an engine upon a vehicle frame, or in the mounting of oil and fuel tanks, storage batteries, acoustic alarm devices, radiators, or the like.

Obviously, the said invention is not limited to the form of construction herein described, this being given solely by way of example, and for instance, the rapid insertion may be effected by means of apparatus other than compressed air presses, and in particular, by hydraulic presses. In like manner, the high speed process may be used not only for obtaining a considerable elongation of the material, but also when the elongation is less than 100 per cent; in all cases the high speed process will permit to minimize the waste from the operation.

It will be understood that the high speed, although it is desirable for the first operation of introducing the rubber insert into the outer sleeve, is not always indispensable while the high speed is essential for the second operation of introducing the inner sleeve into the rubber insert because the rubber insert has been already considerably compressed by the first operation.

Having now described my invention what I claim as new and desire to secure by Letters Patent is:

1. A process of manufacturing flexible joints comprising at least two rigid members and a hollow insert of elastic material, which consists in introducing said insert into a recess of one of said members and introducing the second member at a high speed into said insert.

2. A process according to claim 1 which further comprises dipping said members and said insert into a lubricant prior to the introduction step.

3. A machine for the manufacture of flexible joints comprising two coaxial sleeves and an intermediate elastic ring, which comprises a compressed air press of the quick acting type, the piston of said press having a cylindrical boss and an annular groove for receiving the internal sleeve, and an auxiliary tool for guiding the movement of said internal sleeve into the elastic ring during the insertion.

In testimony whereof I have signed my name to this specification.

LEON THIRY.